United States Patent
Lim et al.

(10) Patent No.: US 6,985,204 B2
(45) Date of Patent: Jan. 10, 2006

(54) LIQUID CRYSTAL DISPLAY DEVICE HAVING SPACER DENSITY AND METHOD OF FABRICATING THE SAME

(75) Inventors: Byoung-Ho Lim, Gyungsangbuk-Do (KR); Tae-Yong Jung, Daegu (KR); Sung-Gu Kang, Gyungsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/447,954

(22) Filed: May 30, 2003

(65) Prior Publication Data

US 2004/0125319 A1    Jul. 1, 2004

(30) Foreign Application Priority Data

Dec. 31, 2002    (KR) ...................... 10-2002-0088470

(51) Int. Cl.
*G02F 1/1339*    (2006.01)
*G02F 1/13*    (2006.01)

(52) U.S. Cl. ...................... 349/155; 349/156; 349/157; 349/187

(58) Field of Classification Search ................. 349/42, 349/43, 155–157, 187, 189
See application file for complete search history.

(56) References Cited

U.S. PATENT DOCUMENTS

| | | | | |
|---|---|---|---|---|
| 6,208,402 | B1 * | 3/2001 | Tajima | 349/156 |
| 6,377,328 | B1 * | 4/2002 | Morimoto et al. | 349/155 |
| 6,392,736 | B1 * | 5/2002 | Furukawa et al. | 349/158 |
| 6,433,852 | B1 * | 8/2002 | Sonoda et al. | 349/156 |
| 6,535,264 | B1 * | 3/2003 | Imabayashi et al. | 349/155 |
| 6,819,390 | B2 * | 11/2004 | Washizawa et al. | 349/155 |
| 2002/0003599 | A1 * | 1/2002 | Kadota et al. | 349/155 |
| 2003/0025868 | A1 * | 2/2003 | Hiroshima et al. | 349/156 |
| 2003/0071959 | A1 * | 4/2003 | Koyama | 349/156 |
| 2004/0114087 | A1 * | 6/2004 | Cho et al. | 349/155 |

FOREIGN PATENT DOCUMENTS

| | | | |
|---|---|---|---|
| JP | 3-137620 | * | 6/1991 |
| JP | 2001-166310 | | 6/2001 |
| JP | 2001-305552 | | 10/2001 |
| JP | 2002-287155 | | 10/2002 |
| JP | 2002-350857 | | 12/2002 |
| JP | 2002-350867 | | 12/2002 |

* cited by examiner

*Primary Examiner*—Tarifur R. Chowdhury
(74) *Attorney, Agent, or Firm*—McKenna Long & Aldridge LLP

(57) ABSTRACT

A liquid crystal display device includes first and second substrates, a plurality of gate lines and data lines on the first substrate, a plurality of switching devices at cross portions of the gate and data lines, a passivation layer on the plurality of switching devices, a plurality of ball spacers on the passivation layer, a color filter layer on the second substrate, and a plurality of column spacers on the color filter layer.

17 Claims, 6 Drawing Sheets

LIQUID CRYSTAL DISPLAY DEVICE HAVING SPACER DENSITY AND METHOD OF FABRICATING THE SAME

The present invention claims the benefit of Korean Patent Application No. 88470/2002 filed in Korea on Dec. 31, 2002, which is hereby incorporated by reference.

BACKGROUND OF THE INVENTION

1. Field of the Invention

The present invention relates to a spacer for maintaining a cell gap between an upper substrate and a lower substrate of a liquid crystal display device, and in particular to a liquid crystal display device using both a ball spacer and a patterned spacer having a patterned shape.

2. Description of the Related Art

A liquid crystal display device commonly includes a lower substrate upon which a plurality of switching devices are arranged in a matrix configuration and an upper substrate upon which a plurality of color resins are arranged in a matrix configuration for displaying image data. The plurality of switching devices commonly includes a thin film transistor (TFT) array substrate having a plurality of gate lines arranged in rows along a horizontal direction, a plurality of data lines arranged in columns along a vertical direction so as to cross the gate lines, and a TFT is commonly formed at each cross point of the gate and data lines to function as a switching device.

The color filter substrate includes a black matrix for shielding unwanted light that proceeds directly from a lower portion of the liquid crystal display, a sub-color filter having red, green, and blue colors, and a common electrode for supplying an electric field to liquid crystal molecules of a liquid crystal material. In addition, a cell gap between the color filter substrate and the TFT array substrate is commonly maintained by a spacer, and the liquid crystal material fills the cell gap.

FIG. 1 is a flow chart of a fabrication method of a liquid crystal display device according to the related art. In FIG. 1, the fabrication method includes preparing a color filter substrate, forming an alignment layer on a TFT array substrate, rubbing the alignment layer for freely aligning subsequently-formed liquid crystal of a liquid crystal material, forming a seal pattern, scattering spacers for maintaining a uniform cell gap between the TFT array substrate and the color filter substrate, bonding the TFT array and color filter substrates together, cutting the bonded substrate into a plurality of unit cells, and injecting the liquid crystal material into each of the unit cells.

During a first step, a transparent substrate is prepared, and a plurality of switching devices and gate and data lines are arranged on the transparent substrate in a matrix configuration. In addition, a pixel electrode corresponding to each of the switching devices is formed.

During the second step, the alignment layer is formed on the lower substrate using a coating process for coating a polymer substance, and a rubbing process for alignment of liquid crystal molecules of the liquid crystal material is performed. The alignment layer is a thin polymer film, such as a polyimide, and is uniformly deposited onto the lower substrate. The rubbing process includes rubbing the alignment layer along a certain direction with a fabric, whereby the liquid crystal molecules are aligned along the certain direction according to the rubbing direction. The rubbing process is important to determine the initial alignment of the liquid crystal molecules so that the liquid crystal display device can perform normally and have uniform display characteristics.

During a third step, the seal pattern is formed to maintain a cell gap between the upper and lower substrates in which the liquid crystal material is injected. In addition, the seal pattern prevents the injected liquid crystal material from leaking out between the TFT array and color filter substrates. The seal pattern commonly includes a thermosetting resin and is formed as a pattern along a perimeter region of an active region of the lower substrate using a screen printing method.

During the fourth step, the spacers are formed to have a certain size to maintain the uniform cell gap between the TFT array and color filter substrates, and are scattered uniformly onto the color filter substrate. The scattering method can be commonly divided into a wet scattering method for mixing the spacers in an alcohol solution, and spraying the mixture, and a dry scattering method for scattering only the spacers. In addition, the dry scattering method is commonly divided into an electrostatic scattering method using static electricity and an anti-static scattering method using gas pressure. The anti-static scattering method is mostly used for a liquid crystal cell structure having weak static electricity.

During the fifth step, after the spacer scattering is completed, the bonding process for attaching the color filter substrate and the TFT array substrate is performed. A uniform cell gap generated during the bonding process is determined by an error margin between the upper color filter and lower substrates for individually designing liquid crystal display devices with an accuracy of several $\mu$m. When the uniform cell gap exceeds the error margin, light leaks from the device, thereby decreasing image quality display of the liquid crystal cell.

During the sixth step, the bonded lower and upper glass substrates are cut into a plurality of unit cells. During prior cutting processes, liquid crystal material is simultaneously injected into the plurality of cells, and the cutting is performed. However, with the presently increased size of liquid crystal display devices, the liquid crystal material is injected after the cutting is performed.

During the seventh step, the liquid crystal material is injected into each of the plurality of unit cells. Each of the unit cells has a cell gap of several $\mu$m per several hundreds of cm$^2$. Accordingly, a vacuum injection method for efficiently injecting the liquid crystal material into the liquid crystal cell is commonly used. The vacuum injection method uses a pressure difference between interior and exterior of the liquid crystal cell through an injection hole in the seal pattern. After the injection of the liquid crystal material, excess liquid crystal material on a liquid crystal injection hole is removed and the injection is sealed. Accordingly, a panel of the liquid crystal display device is fabricated.

However, during the vacuum injection process, an excessive amount of the liquid crystal material is injected into the liquid crystal display panel. Accordingly, shifting of the liquid crystal material, caused by gravity and the like, may occur in subsequent testing processes. Thus, a fabrication process for injecting limited amounts of liquid crystal material into the liquid crystal display panel is required. In addition, a sealing method for removing any of the excessive liquid crystal material has been developed by applying mechanical pressure onto the liquid crystal display panel, or by using high gas pressure gas.

FIG. 2A is a schematic view of a ball spacer scattering method in according to the related art. In FIG. 2A, according to size increase of a panel, spacers 202 are uniformly scattered on an entire surface of a substrate 201 in order to maintain a uniform cell gap. However, since an alignment layer of the substrate 201 may be damaged, scattering of the spacers 202 must be performed carefully.

In response to demands for high display capacity and high display quality, providing the spacers not only functions to maintain a uniform cell gap but also functions to prevent color tone variations according to temperature variations or movement of the spacers or creation of voids. Accordingly, the spacers are commonly divided into glass spacers, which are fabricated by discharging non-alkali glass, and plastic spacers. In comparison with hard glass ball spacers, the plastic ball spacers are unstable to maintain the uniform cell gap. However, performance of the plastic ball spacers is dependent upon elastic body variables directly related to a load applied to the plastic ball spacers. Thus, it is appropriate that a substance for forming the plastic ball spacers can maintain a minute cell thickness.

By using a material for the plastic spacers that has a thermal coefficient of expansion close to the thermal coefficient of expansion of the liquid crystal material, it is possible to prevent the plastic spacers from migrating within the cell gap when the unit cells are exposed to relatively high temperatures. Conversely, the plastic spacers prevent creation of voids when the unit cells are exposed to relatively low temperatures.

FIG. 2B is a cross sectional view of a liquid crystal display panel in according to the related art. In FIG. 2B, a color filter substrate 203 is overlapped with a TFT array substrate 201 to contact the plastic ball spacers 202, and the two substrates 201 and 203 are bonded together by the seal pattern 204. Accordingly, since the plastic ball spacers 202 have a thermal coefficient of expansion similar to that of the liquid crystal material, the unit cell may be operated under varying temperature conditions. However, by spraying the plastic ball spacers 202 onto the TFT array substrate 201 having an alignment layer, it is impossible to adjust the scattering position of the plastic ball spacers 202. Accordingly, the scattering density is not uniform across an entire surface of the lower TFT array substrate 201. Thus, when the plastic ball spacers 202 are scattered onto the pixel region of the TFT array substrate 201, contrast of the liquid crystal display device may decrease.

In addition, since the scattering density of the plastic ball spacers 202 varies according to positions of the unit cells, external impact and corresponding impact absorption degrees differ according to positions of the unit cells. Accordingly, vibration generation ratios vary. Thus, the individual liquid crystal display devices will have different trembles according to the positions of the unit cells such that a ripple phenomenon is displayed by the device.

In order to solve the above-described problem, a patterned spacer forming method capable of scattering spacers formed of photosensitive resin at certain positions on the substrate has been developed, wherein a shape of the patterned spacer is controlled. During a fabrication process of the liquid crystal display device, formation of the patterned spacers is nearly the same as the formation of the ball spacers except for an additional spacer patterning process. Accordingly, formation of the spacers allows for position adjustment and patterning of the spacers.

It is possible to form the patterned spacers anywhere on the upper substrate or the lower substrate. However, in general, the patterned spacers are formed on the upper substrate. The upper substrate and the lower substrate are fabricated separately and are bonded together during a subsequent process. Accordingly, by forming the spacers on the upper substrate using a comparatively simple process, it is possible to simultaneously fabricate the two substrates.

The step of forming the patterned spacers on the upper substrate includes preparing the substrate, forming a black matrix for shielding unnecessary light on the substrate, forming a color filter made of red, green, and blue color resins, forming an overcoat layer for plating the surface of the color filter layer; forming a common electrode for supplying an electric field to a liquid crystal material formed on the overcoat layer, forming patterned spacers made of photosensitive resin on the common electrode, and forming an alignment layer made of a polyimide group material for alignment of the liquid crystal material on the patterned spacers.

FIGS. 3A and 3B are cross sectional views of forming patterned spacers according to the related art. In FIG. 3A, the patterned spacers are formed using a photolithographic method, wherein a photosensitive resin 306 is deposited on the common electrode 305. Then, a mask 307, which includes a spacer pattern, is positioned to cover the photosensitive resin 306, and ultraviolet light is irradiated through the spacer pattern onto the photosensitive resin 306. Accordingly, subsequent processing provides that regions of the photosensitive resin 306 that have been exposed to the ultraviolet light remains while other regions of the photosensitive resin 306 not exposed to the ultraviolet light are removed, thereby forming the patterned spacers on the common electrode 305. Thus, by providing the spacers on specific portions of the common electrode 305, it is possible to scatter the spacer on the black matrix region except where the pixel regions are formed. Accordingly, contrast ratio and aperture ratio may not be reduced.

However, at high operating temperatures, use of the patterned spacers causes gravity inferiority in which the liquid crystal material is inclined to migrate along the gravity direction. Accordingly, the liquid crystal material may pool at a bottom most region of the liquid crystal display device. However, thermal expansion of the patterned spacers is smaller the thermal expansion of the liquid crystal material and glass used to form the upper and lower substrates. Accordingly, when the liquid crystal display device is tested at relatively high temperatures, a gap is created between the glass substrate and the patterned spacers due to the difference in the thermal expansion of the patterned spacer material and the glass substrates. Thus, the liquid crystal material leaks through the gap and migrates toward the gravity direction.

In FIG. 3B, upper and lower substrates 32 and 31 are bonded together using a sealant 33. Patterned spacers 34 are positioned to maintain a uniform gap between the upper and lower substrates 32 and 31, and a liquid crystal material 35 is injected into the gap between the upper and lower substrates 32 and 31 through an injection hole (not shown). Accordingly, an increase in the amount of the liquid crystal material 35 filling the gap results in increasing the effects of gravity inferiority. Thus, excessive amounts of the injected liquid crystal material are removed by applying pressure on the both exterior surfaces of the liquid crystal display panel with a flat metal plate using a mechanical method after injecting the liquid crystal material 35 into the gap and before encapsulating the injection hole (not shown). Alternatively, the excessive amounts of the injected liquid crystal material may be removed by injecting gas into a chamber in which the liquid crystal material injection process is performed to form a high pressure state on both of the exterior surfaces of the liquid crystal display panel using a sealing method.

By using the sealing method, small amounts of the liquid crystal material are injected into the liquid crystal display panel. Accordingly, negative pressure imparted onto the glass substrates along an interior direction is formed between the upper and lower substrates of the liquid crystal display panel. Thus, it is possible to prevent the liquid crystal material from migrating toward the gravity direction at high temperatures. However, although the sealing method is used, it is impossible to completely prevent the gravity inferiority between the patterned spacers.

SUMMARY OF THE INVENTION

Accordingly, the present invention is directed to a liquid crystal display device and method of fabricating the same that substantially obviates one or more of the problems due to limitations and disadvantages of the related art.

An object of the present invention is to provide a liquid crystal display device having quality display characteristics at high temperatures.

Another object of the present invention is to provide a liquid crystal display device having quality display characteristics during heavy vibrations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates, a plurality of gate lines and data lines on the first substrate, a plurality of switching devices at cross portions of the gate and data lines, a passivation layer on the plurality of switching devices, a plurality of ball spacers on the passivation layer, a color filter layer on the second substrate, and a plurality of column spacers on the color filter layer.

In another aspect, a method of fabricating a liquid crystal display device includes forming a first substrate including a plurality of ball spacers, forming a second substrate including a plurality of column spacers, bonding the first and second substrates together by pressure-hardening, cutting the bonded first and second substrates into a plurality of unit liquid crystal display cells, forming a liquid crystal material layer within each of the unit liquid crystal display cells through an injection hole, and pressure-sealing the injection hole of each of the unit liquid crystal display cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings.

Figure 1:
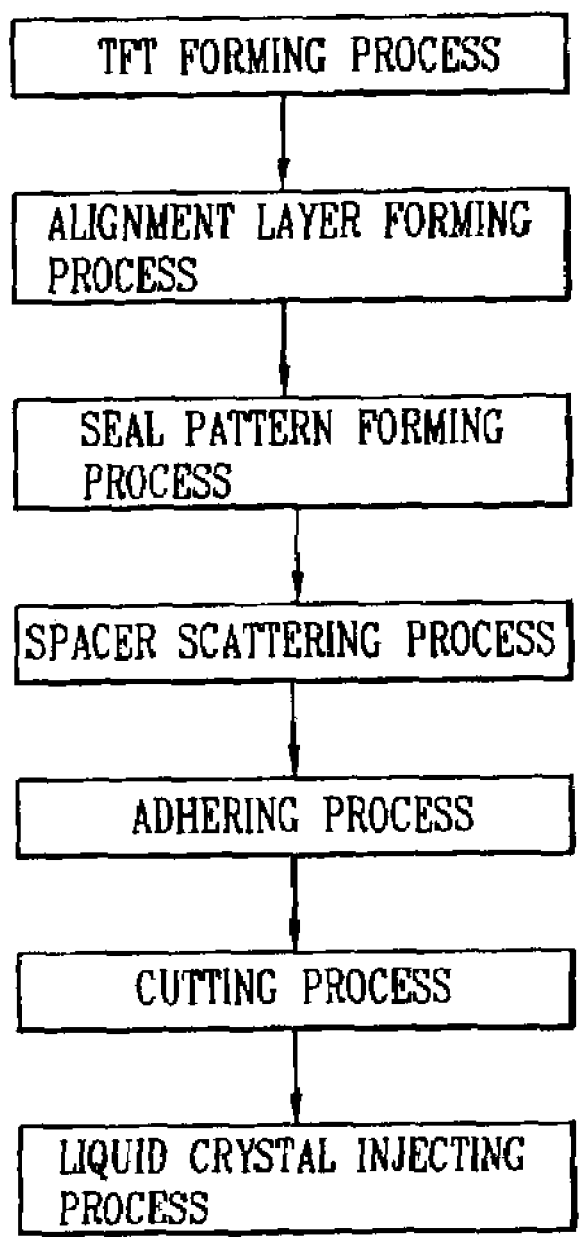
FIG. 1 is a flow chart of a fabrication method of a liquid crystal display device according to the related art.
Figure 2A:
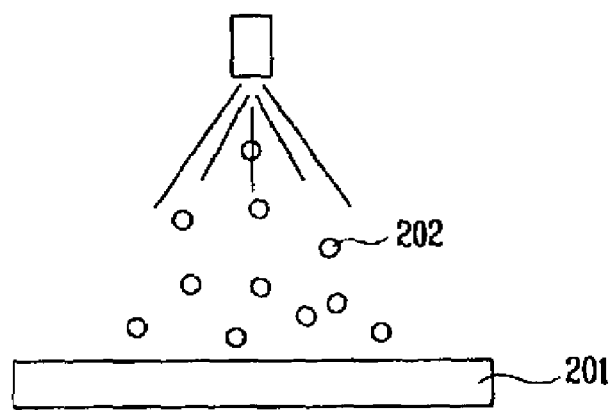
FIG. 2A is a schematic view of a ball spacer scattering method in according to the related art.
Figure 2B:
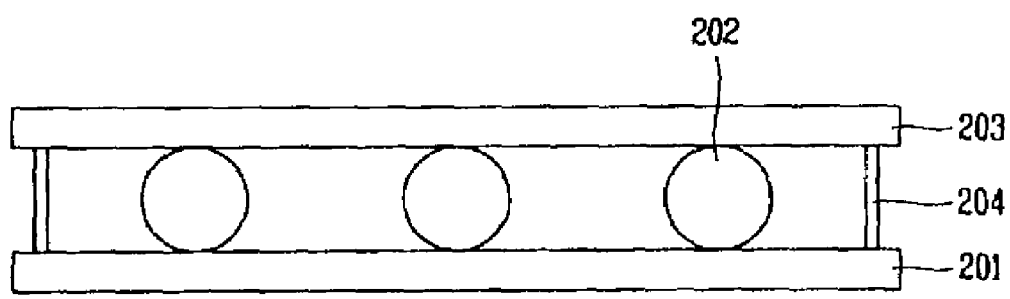
FIG. 2B is a cross sectional view of a liquid crystal display panel in according to the related art.
Figure 3A:
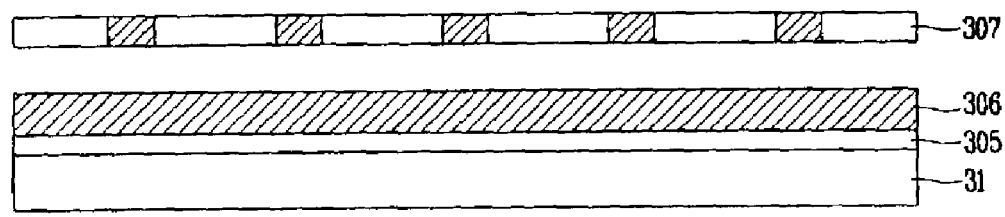
FIGS. 3A and 3B are cross sectional views of forming patterned spacers according to the related art.
Figure 3B:
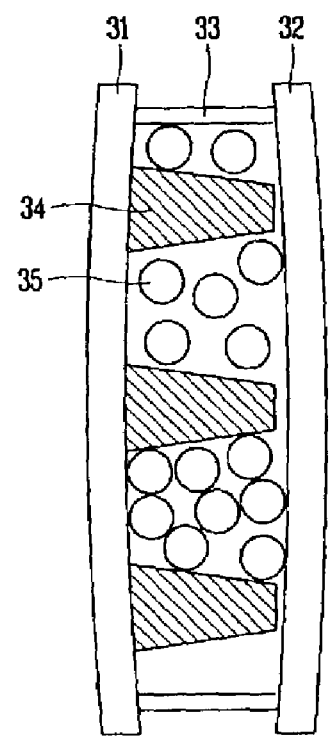
Figure 4A:
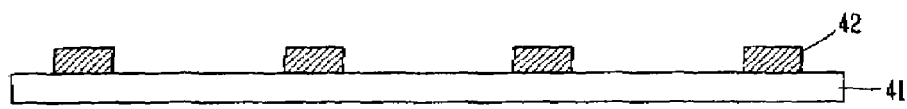
FIGS. 4A to 4F are cross sectional views of an exemplary fabrication process for forming an upper substrate according to the present invention.

FIGS. 4A to 4F are cross sectional views of an exemplary fabrication process for forming an upper substrate according to the present invention. In FIG. 4A, a black matrix 42 may be formed on a transparent substrate (upper substrate) 41 at positions opposite to gate and data lines and switching devices formed on a lower substrate (not shown) of the liquid crystal display device. The black matrix 42 may be formed between sub-color filters in order to shield light passing a reverse tilt domain formed at a circumference of a pixel electrode formed on the lower substrate. The black matrix 42 may include a metal thin film formed of Cr or an organic substance, and a dual layer such as Cr/CrOx, for example, may be used for low reflection.

Figure 4B:
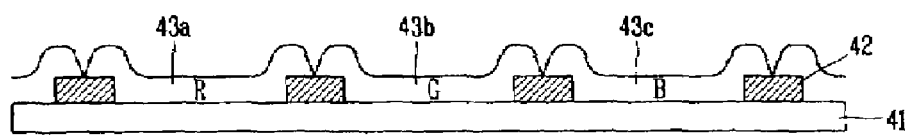

In FIG. 4B, steps for forming a color filter on the transparent substrate 41 having the black matrix 42 may include a pigment distribution method, for example. Alternatively, a dying method, an electro-deposition method, and a printing method may be used to form the color filter. During the pigment distribution method, one of a red, green, and blue color resin may be coated on an entire surface of the transparent substrate 41 upon which the black matrix 42 has been previously formed. Then, using a selective exposure process, a red sub-color filter 43a may be formed on a desired region of the transparent substrate 41 between adjacent portions of the black matrix 42. Next, a green color resin may be coated on the transparent substrate 41 upon which the red sub-color filter 43a has been previously formed, and the green sub-color filter 43b may be formed on the transparent substrate 41 between other adjacent portions of the black matrix 42 using a selective exposure process. Next, a blue color resin may be coated on the transparent substrate 41 upon which the red sub-color filter 43a and the green sub-color filter 43b have been previously formed, and the blue sub-color filter 43c may be formed on the transparent substrate 41 between other adjacent portions of the black matrix 42 using a selective exposure process. Alternatively, the red, green, and blue sub-color filters 43a, 43b, and 43c may be formed in different orders.

Figure 4C:
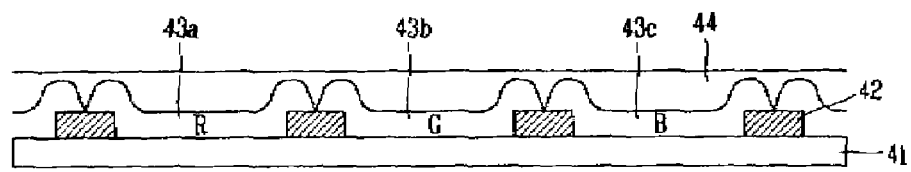

In FIG. 4C, an overcoat layer 44 may be formed on the transparent substrate 41 to cover the red, green, and blue sub-color filters 43a, 43b, and 43c. The overcoat layer 44 may include a transparent resin having insulating characteristics. Alternatively, formation of the overcoat layer 44 may be deleted. For example, when using a Cr group metal to form the black matrix 42, the black matrix may have a very low thickness on the order of several thousand Å. Accordingly, there may be no need to form overcoat layer 44. However, when using a resin material to form the black matrix 42, the black matrix may have a comparatively higher thickness on the order of 1.0 to 1.5 μm, whereby the overcoat layer 44 may be required.

Figure 4D:
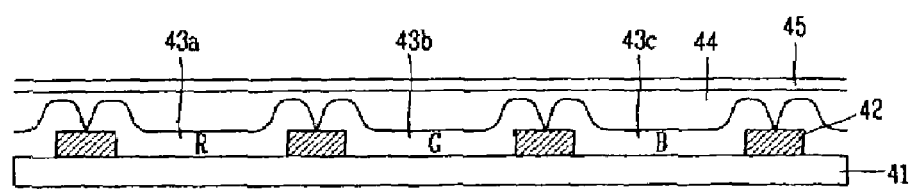

In FIG. 4D, a common electrode 45 may be formed on the overcoat layer 44. The common electrode 45 may include indium tin oxide (ITO) in order to operate liquid crystal together using a pixel voltage supplied to a pixel electrode on a TFT array substrate when a common voltage is supplied to the common electrode 45.

Figure 4E:
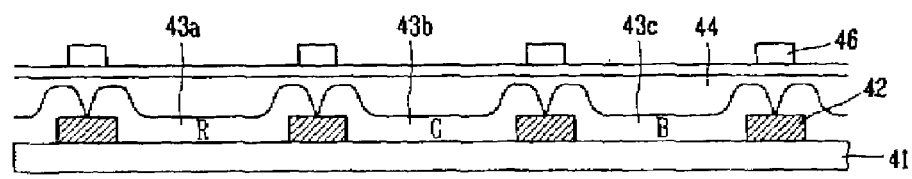

In FIG. 4E, a plurality of spacers 46 may be formed on the common electrode 45 using photolithographic and etching processes. For example, a transparent organic layer may be formed on the common electrode 45, and then patterned to form the plurality of spacers 46. In addition, although not shown, a plurality of ball spacers are formed between the transparent substrate 41 and an additional transparent substrate. Accordingly, gravity inferiority may be prevented.

The plurality of patterned spacers have thermal expansion characteristics comparatively smaller than the thermal expansion characteristics of the transparent substrates and the liquid crystal material. Accordingly, tremble of the liquid crystal material due to impact from an exterior of the liquid crystal display device may be prevented, thereby reducing the ripple phenomenon of the liquid crystal display panel.

In addition, the plurality of ball spacers have relatively good thermal expansion characteristics. During high temperature testing, although the transparent substrates may expand, formation of a gap between the transparent substrates and the plurality of ball spacers may be prevented since the plurality of ball spacers expand together with the transparent substrates. Accordingly, leakage of the liquid crystal material may be prevented. Moreover, the plurality of ball spacers may not migrate to contribute to the gravity inferiority.

Figure 4F:
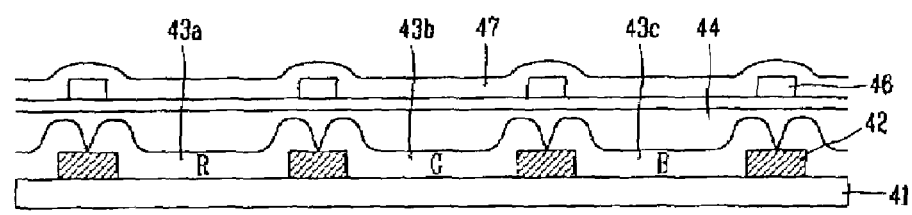

In FIG. 4F, an alignment layer 47 may be formed by coating a transparent organic insulating layer, such as polyimide, on the patterned spacers 46 and the common electrode 45. Next, a rubbing process may be performed on the alignment layer 47 for determining initial alignment of the liquid crystal material. Accordingly, initial processing of the transparent substrate of the liquid crystal display device may be completed.

During the above-detailed processes, it may be possible to form the patterned spacers after forming the alignment layer. However, the alignment layer may be damaged due to chemicals or etchants during the etching process for the patterned spacers. Accordingly, the alignment layer may be formed after forming the patterned spacers.

Alternatively, it may be possible to form the patterned spacers on the upper substrate and form the ball spacers on the lower substrate. However, the forming positions of the patterned and ball spacers may be everywhere on the upper and lower substrates.

Figure 5:
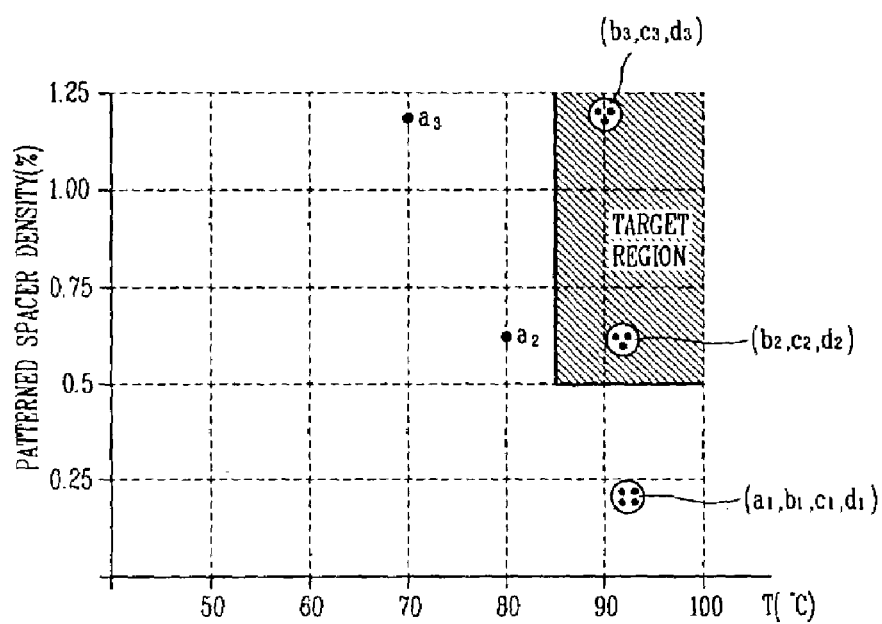
FIG. 5 is a table and graph showing exemplary test results according to the present invention.

FIG. 5 is a table and graph showing exemplary test results according to the present invention. In FIG. 5, there are a first test group for measuring gravity inferiority through a liquid crystal display panel using only patterned spacers on a substrate, a second test group for measuring gravity inferiority by spraying a plurality of ball spacers having a density of not greater than 50 ball spacers per square centimeter with the patterned spacers on a substrate, a third test group for measuring gravity inferiority by spraying the plurality of ball spacers with a density range of 50 to 100 ball spacers per square centimeter with the patterned spacers on a substrate, and a fourth test group for measuring gravity inferiority by spraying the plurality of ball spacers within a density range of 100 to 150 ball spacers per square centimeter with the patterned spacers on a substrate. In addition, each test group is divided into several different groups according to patterned spacers having area densities of 0.24%, 0.58%, and 1.2%.

In FIG. 5, the X-axis is a temperature axis, and the Y-axis is an area density of the patterned spacers. The area density is a spacer scattering area of the total active region, and is based on an area in which the spacers are grounded within the active region. A K-region at an upper right end of the graph represents a target region in which there is no ripple phenomenon and gravity inferiority as observed with the naked eye. In addition, each indication point displays a gravity inferiority occurrence point.

In the panel of the first test group using only the patterned spacers without using the ball spacers, sample a1 indicates a temperature at which a sample having a patterned spacer density of 0.24% shows the gravity inferiority, wherein the gravity inferiority occurs at 90° C. The sample a1 satisfies the condition of the gravity inferiority limitation temperature 85° C., however, the ripple phenomenon occurs as observed by the naked eye.

In the first test group, sample a2 indicates a gravity inferiority occurrence temperature of the sample having a patterned spacer density of 0.58%, the gravity inferiority occurs at 80° C. Accordingly, sample a2 does not satisfy the gravity inferiority limitation temperature required for a liquid crystal display device.

In the first test group, sample a3 indicates gravity inferiority occurrence temperature of the sample having a patterned spacer density of 1.2%, the gravity inferiority occurs at 70° C. Accordingly, sample a3 does not satisfy the gravity inferiority limitation temperature required for a liquid crystal display device.

In the second test group, which includes samples having a ball spacer scattering density less than 50 ball spacers per square centimeter, sample b1 indicates a temperature at which a sample having a patterned spacer density of 0.24% shows the gravity inferiority, and the gravity inferiority occurs at 90° C. The sample b1 satisfies the condition of the gravity inferiority limitation temperature 85° C., however, the ripple phenomenon occurs.

In the second test group, sample b2 indicates gravity inferiority occurrence temperature of the sample having a patterned spacer density of 0.58%, the gravity inferiority occurs at a temperature not less than 90° C. In addition, sample b2 is placed within the target region in which the ripple phenomenon does not occur as observed with the naked eye.

In the second test group, sample b3 indicates gravity inferiority occurrence temperature of the sample having a patterned spacer density of 1.2%, the gravity inferiority occurs at a temperature not less than 90° C. In addition, sample b3 is placed within the target region in which the ripple inferiority does not occur as observed with the naked eye.

In the third test group, which includes a ball spacer scattering density within a range of 50 to 100 ball spacers per square centimeter, sample c1 indicates a temperature at which a sample having a patterned spacer density of 0.24% shows the gravity inferiority, and the gravity inferiority occurs at 90° C. The sample c1 satisfies the condition of the gravity inferiority limitation temperature 85° C., however, the ripple phenomenon occurs.

In the third test group, sample c2 indicates gravity inferiority occurrence temperature of the sample having a patterned spacer density of 0.58%, the gravity inferiority occurs at a temperature not less than 90° C. In addition, sample c2 is placed within the target region in which the ripple inferiority does not occur as observed with the naked eye.

In the third test group, sample c3 indicates gravity inferiority occurrence temperature of the sample having a patterned spacer density of 1.2%, the gravity inferiority occurs at a temperature not less than 90° C. In addition, sample c3 is placed within the target region in which the ripple inferiority does not occur as observed with the naked eye.

Each test of the above test samples were performed in a thermohygrostat chamber, and were performed for at least 5 hours.

Below, Table 1 shows the gravity inferiority occurrence of each test sample having a patterned spacer area density of 0.24% according to temperature and ball spacer scattering density of the sample.

TABLE 1

| Test sample | Scattering density of ball spacers (number/cm$^2$) | | | |
|---|---|---|---|---|
| | 0<br>Sample 1 | ~50<br>Sample 2 | 50~100<br>Sample 3 | 100~150<br>Sample 4 |
| TEMPERATURE (° C.) | | | | |
| 60 | Normal | Normal | Normal | Normal |
| 70 | Normal | Normal | Normal | Normal |
| 80 | Normal | Normal | Normal | Normal |
| Not less than 90 | Impossible to judge due to deformation of a back light sheet | | | |

In Table 1, there are four test samples having a ball spacer scattering density of 0%, less than 50, within the range of 50~100 and within the range of 100~150, and gravity inferiority occurrence of the test samples having a scattering density of 0.24% is shown. In addition, each sample does not show the gravity inferiority until 90° C. At a temperature higher than 90° C., it was impossible to judge gravity inferiority due to deformation of a back light sheet of the liquid crystal display device.

Table 2 shows gravity inferiority occurrence of test samples obtained by mixing ball spacers with a liquid crystal display panel having a patterned spacer density of 0.58% according to variations of temperature.

TABLE 2

| Test sample | Scattering density of ball spacers (number/cm$^2$) | | | |
|---|---|---|---|---|
| | 0<br>Sample 1 | ~50<br>Sample 2 | 50~100<br>Sample 3 | 100~150<br>Sample 4 |
| TEMPERATURE (° C.) | | | | |
| 60 | Normal | Normal | Normal | Normal |
| 70 | Normal | Normal | Normal | Normal |
| 80 | Abnormal | Normal | Normal | Normal |
| Not less than 90 | Impossible to judge due to deformation of a back light sheet | | | |

In Table 2, a test sample not using ball spacers indicates the gravity inferiority occurrence at a temperature not less than 80° C., and the other samples in Table 2 do not show the gravity inferiority occurrence.

Table 3 shows gravity inferiority occurrence of test samples obtained by mixing ball spacers with a liquid crystal display panel having a patterned spacer density of 1.2% according to variations of temperature.

TABLE 3

| Test sample | Scattering density of ball spacers (number/cm$^2$) | | | |
|---|---|---|---|---|
| | 0<br>Sample 1 | ~50<br>Sample 2 | 50~100<br>Sample 3 | 100~150<br>Sample 4 |
| TEMPERATURE (° C.) | | | | |
| 60 | Normal | Normal | Normal | Normal |
| 70 | Abnormal | Normal | Normal | Normal |
| 80 | Abnormal | Normal | Normal | Normal |
| Not less than 90 | Impossible to judge due to deformation of a back light sheet | | | |

In Table 3, a test sample not using the ball spacer shows the gravity inferiority occurrence at a temperature not less than 70° C., and the other samples in Table 3 do not show the gravity inferiority occurrence. In particular, in the second test group, a ball spacer scattering density is maintained to be not less than 25 ball spacers per square centimeter.

There may be two ball spacer scattering methods: a wet scattering method wherein ball spacers are mixed with alcohol and sprayed; and a dry scattering method wherein the ball spacers are positively charged with electricity and maintained within an active region in a grounded state during scattering. However, the dry scattering method is capable of uniformly scattering the ball spacers.

In addition, the ball spacers may be formed almost anywhere on the lower substrate. Moreover, since the upper substrate and the lower substrate may be separately fabricated, it may also be possible to form the ball spacers on a substrate different from a substrate upon which the patterned spacers are formed, thereby improving fabrication efficiency.

In order to prevent the gravity inferiority and the ripple phenomenon, both the patterned spacers and the ball spacers may be used, and the sealing method may be used as a sealing method.

Figure 6:
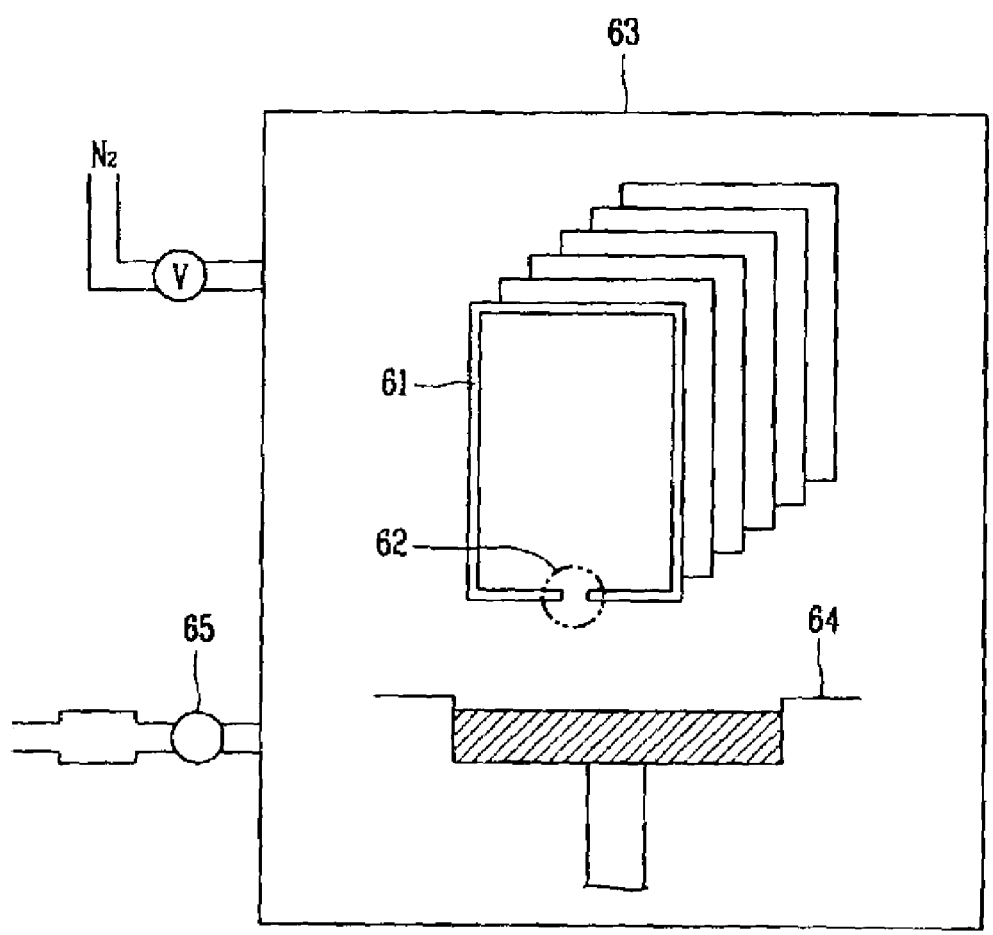
FIG. 6 is a schematic view of a sealing method according to the present invention.

FIG. 6 is a schematic view of a sealing method according to the present invention. In FIG. 6, during a pressurizing-sealing method, a liquid crystal injection hole 62 is formed at a unit liquid crystal cell 61 obtained by attaching an upper substrate and a lower substrate using sealant material. A unit liquid crystal cell 61 may be moved into a liquid crystal injecting vacuum chamber 63 that may include a liquid crystal tray 64. In the liquid crystal injecting vacuum chamber 63, pressure within a gap between the unit liquid crystal cells 61 may be reduced to about $10^{-3}$ Torr using a vacuum pump 65 positioned at a certain side of the injecting chamber 63. An injection hole 62 of the unit liquid crystal cell 61 may be separated from the liquid crystal tray 64. When the pressure reduction is completed, a valve (not shown) attached to the vacuum pump 65 may be closed. Then, the unit liquid crystal cell 61 may be positioned onto the liquid crystal tray 64, and the liquid crystal injection hole 62 is dipped into the liquid crystal tray 64. Next, nitrogen ($N_2$) gas may be gradually introduced into the injecting chamber 63, wherein liquid crystal material filled in the liquid crystal tray 64 may be injected into the unit liquid crystal cell 61. The introduction of the nitrogen (N$_2$) gas may continue until internal pressure of the injecting chamber 63 reaches atmospheric pressure.

When the liquid crystal material is injected, as described above, excess amounts of the liquid crystal material may be injected into the unit liquid crystal cell 61. Accordingly, a thickness of a central portion of the unit liquid crystal cell 61 may be relatively large when compared to a thickness of outer portions of the unit liquid crystal cell 61. Thus, the excessive amounts of the liquid crystal material may cause gravity inferiority during test processes of the unit liquid crystal cell 61. However, the excessive amounts of the liquid crystal material may be removed from the liquid crystal cell 61 after the liquid crystal injecting process is completed by using a mechanical method or a gas pressure application method.

As described above, during the sealing method, by introducing the nitrogen (N$_2$) gas into the vacuum chamber 63 at a pressure greater than atmospheric pressure, such as 0.5 kg/cm$^2$, the excessive amounts of the liquid crystal material may be removed from the unit liquid crystal cell 61. Afterward, the sealing may be performed by irradiating ultraviolet light onto the liquid crystal injection hole 62 of the unit liquid crystal cell 61.

In the pressurizing-sealing method, the liquid crystal display panel internally contracts due to negative pressure within the unit liquid crystal cell 61, thereby reducing gravity inferiority during high temperature testing.

In the present invention, the pressurizing-sealing method may be used as the sealing method of the liquid crystal display panel, and all tests have been performed by using the pressurizing-sealing method.

It will be apparent to those skilled in the art that various modifications and variations can be made in the liquid crystal display device and method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a plurality of gate lines and data lines on the first substrate;
   a plurality of switching devices at cross portions of the gate and data lines;
   a passivation layer on the plurality of switching devices;
   a plurality of ball spacers on the passivation layer, wherein a density of the ball spacers is between about 25/cm$^2$ and about 150/cm$^2$;
   a color filter layer on the second substrate; and
   a plurality of column spacers on the color filter layer, wherein a density of the column spacers is at least 0.24%.

2. The device according to claim 1, wherein the density of the plurality of column spacers is within a range of 0.24% and 1.2%.

3. The device according to claim 1, wherein the plurality of ball spacers are formed on the second substrate with the plurality of column spacers.

4. A method of fabricating a liquid crystal display device, comprising:
   forming a first substrate including a plurality of ball spacers, wherein a density of ball spacers is between about 25/cm$^2$ and about 150/cm$^2$;
   forming a second substrate including a plurality of column spacers;
   bonding the first and second substrates together by pressure-hardening;
   cutting the bonded first and second substrates into a plurality of unit liquid crystal display cells;
   forming a liquid crystal material layer within each of the unit liquid crystal display cells through an injection hole; and
   pressure-sealing the injection hole of each of the unit liquid crystal display cells,
   wherein a density of the column spacers is at least 0.24%.

5. The method according to claim 4, wherein the density of the plurality of column spacers is within a range of 0.24% and 1.2%.

6. The method according to claim 4, wherein the plurality of ball spacers are formed on the second substrate together with the plurality of column spacers.

7. The method according to claim 4, wherein forming a first substrate includes:
   forming a plurality of gate lines on the first substrate;
   forming an insulating layer on the plurality of gate lines;
   forming a semiconductor layer on the insulating layer;
   forming a plurality of data lines on the semiconductor layer;
   forming a passivation layer on the plurality of data lines;
   forming a plurality of pixel electrodes on the passivation layer; and
   forming the plurality of ball spacers on the passivation layer.

8. The method according to claim 4, wherein forming a second substrate includes:
   forming a black matrix layer on the second substrate;
   forming a color filter layer on the black matrix layer;
   forming the plurality of column spacers on the color filter layer;
   forming an alignment layer on the plurality of column spacers; and
   forming a sealant on the alignment layer.

9. A method of fabricating a liquid crystal display device, comprising:
   forming a first substrate including a plurality of ball spacers, wherein a density of ball spacers is between about 25/cm$^2$ and about 150/cm$^2$;
   forming a second substrate including a plurality of column spacers, the column spacers have a density of at least 0.24%; and
   forming a liquid crystal layer between the first and second substrates.

10. The method according to claim 9, further comprising:
    bonding the first and second substrates; and
    cutting the bonded first and second substrates into a plurality of unit liquid crystal display cells.

11. The method according to claim 10, further comprising pressure-sealing the unit liquid crystal display cells.

12. The method according to claim 9, wherein the density of the plurality of column spacers is within a range of 0.24% and 1.2%.

13. The method according to claim 9, wherein the plurality of ball spacers are formed on the second substrate together with the plurality of column spacers.

14. The method according to claim 9, wherein forming a first substrate includes:
    forming a plurality of gate lines on the first substrate;
    forming an insulating layer on the plurality of gate lines;
    forming a semiconductor layer on the insulating layer;
    forming a plurality of data lines on the semiconductor layer;
    forming a passivation layer on the plurality of data lines;

forming a plurality of pixel electrodes on the passivation layer; and forming the plurality of ball spacers on the passivation layer.

15. The method according to claim 9, wherein forming a second substrate includes:

forming a black matrix layer on the second substrate;

forming a color filter layer on the black matrix layer;

forming the plurality of column spacers on the color filter layer;

forming an alignment layer on the plurality of column spacers; and forming a sealant on the alignment layer.

16. The method according to claim 15, further comprising a common electrode on the color filter layer.

17. The method according to claim 15, further comprising an overcoat layer on the color filter layer.

* * * * *